United States Patent Office 3,267,975
Patented August 23, 1966

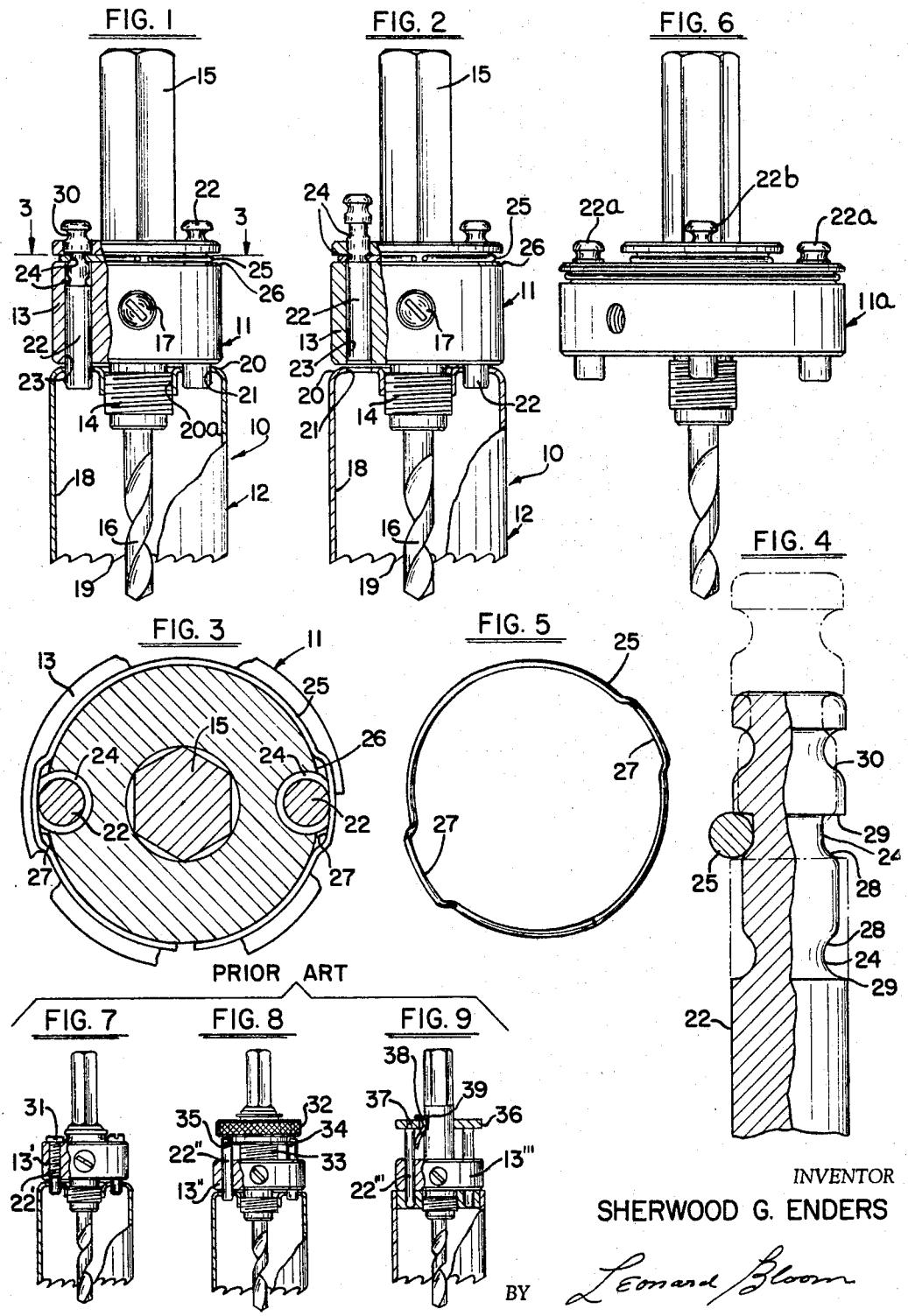

3,267,975
COUPLING MEANS FOR HOLE SAW ASSEMBLY
Sherwood G. Enders, Bowley's Quarters, Md., assignor to The Black and Decker Manufacturing Company, Towson, Md., a corporation of Maryland
Filed June 16, 1964, Ser. No. 375,615
2 Claims. (Cl. 143—85)

The present invention relates to a coupling means for a hole saw assembly, and more particularly, to an improved coupling means in which one or more drive elements are journaled, independently of one another, for axial sliding movement on a mandrel body.

In the prior commercial practices of which I am aware, hole saw assemblies have been manufactured and sold of the type comprising a mandrel and a hole saw blade secured to the mandrel. The mandrel comprises a shank portion adapted to be driven by a portable electric drill or suitable tool, a body portion secured to the shank, and a screw-threaded portion projecting from the mandrel body. The hole saw blade is substantially cup-shaped and comprises a base portion, a hollow cylindrical body portion secured to the base, and a plurality of suitable cutting teeth formed along the exposed circular edge of the blade. The base portion of the hole saw blade has a central aperture secured to the screw-threaded projection of the mandrel; and the base portion further has a pair of apertures, one on each side of the central aperture and diametrically opposite to one another, to receive a respective pair of drive pins carried by the mandrel body. The drive pins provide a positive driving connection or coupling means between the mandrel and the hole saw; and the usual practice is to run the hole saw all the way down on the screw-threaded projection of the mandrel, next to back off the hole saw in the reverse direction by an amount varying from approximately a few degrees to less than half a turn until the drive pins are axially alined with their respective apertures in the base portion of the hole saw, and then to advance the pins axially into their engaged position with the hole saw. In one instance, the drive pins are threaded into the mandrel body and have a screwdriver kerf to facilitate their alternate axial advance and retraction relative to the mandrel body. In another instance, the drive pins are journaled in through bores formed in the mandrel body and have their respective ends keyed to a knurled carrier plate which is screw-threaded to the mandrel shank. Rotation of the carrier plate in one direction or another then causes the drive pins to advance or retract with respect to the mandrel body, and the pins are coupled for movement through the mandrel body in unison with one another. In each of these instances, however, it is necessary to visually aline the drive pins with their respective apertures formed in the base portion of the hole saw, a practice which is inconvenient, if not annoying, to the operator.

The prior art is also exemplified by the now-expired Beckwith Patent 2,349,400 which discloses a pair of pins journaled for axial sliding movement in respective through bores formed in the mandrel body. The pins serve the dual function of positively driving the hole saw and of ejecting the cores from within the hole saw itself. The ends of the pins are anchored in a carrier plate or washer which is slidably mounted on the mandrel shank. One or more leaf springs are secured to the washer, and the leaf springs cooperate with an external annular groove formed on the mandrel shank, thereby providing a detent action between the washer and the mandrel shank. This prior art disclosure, however, is not entirely satisfactory. The pins are keyed together for a conjoint axial movement—they are not journaled independently of one another and hence may not be individually replaced—and the result is such as to require the entire assembly or subassembly to be scraped should one of the pins become bent or jammed in its respective bore in the mandrel body. Moreover, the pins are not free to rotate about their respective axes, and hence the same bearing and wear surface is presented between the pins and the base portion of the hole saw, thus accelerating wear and ultimate failure of the assembly. Not only is the entire assembly more likely to fail, but it also requires more pieces, and hence is more expensive to manufacture.

Accordingly, it is an object of the present invention to alleviate the aforementioned deficiencies of the prior art by providing an improved coupling means for a hole saw assembly in which one or more drive pins are journaled, independently of one another, for axial sliding movement in respective through bores formed in the mandrel body.

It is another object to facilitate a rapid and economical manufacture of a hole saw assembly.

It is yet another object to enable each drive pin to be individually replaced, thereby simplifying the service requirements of the overall assembly.

In accordance with the broad teachings of the present invention, a pair of driving elements, such as cylindrically-formed drive pins, are journaled—independently of one another—for axial sliding movement on the mandrel body. A resiliently-biased detent means is provided between the mandrel and each of the pins, such that the pins have two axial positions relative to the mandrel, one advanced and the other retracted; and in the advanced position, the pins engage respective apertures in the base portion of the hole saw to thereby positively couple the hole saw to the mandrel.

Preferably, the detent means comprises an annular resilient member, such as a split wire ring, carried coaxially on the mandrel body radially of the pins and seated within a respective one of a pair of parallel external annular grooves formed on each pin.

These and other objects of the present invention will become apparent from a reading of the following specification, taken in conjunction with the enclosed drawings, in which:

FIGURE 1 is an elevation of the complete hole saw assembly of the present invention with parts broken away and sectioned to illustrate the preferred form of the coupling means of the present invention;

FIGURE 2 corresponds to a portion of FIGURE 1, but shows how one of the pair of drive pins has been adjusted into its engaged position with respect to the hole saw base portion;

FIGURE 3 is a section view taken along the lines 3—3 of FIGURE 1, showing the manner in which the drive pins are received in respective pockets formed in the split ring which resiliently retains the drive pins relative to the mandrel body;

FIGURE 4 is an enlarged fragmentary view of one of the drive pins in cooperation with its split resilient ring, the broken lines indicating the alternate position of the pin relative to the ring;

FIGURE 5 is a perspective view of the split resilient ring which retains the drive pins on the mandrel body;

FIGURE 6 is a modification showing a "universal" form of mandrel in which two pairs of cylindrical driving pins are mounted on the mandrel body; approximately at right angles to one another, each pair being intended for use with a respective range of hole saw diameters; and FIGURES 7, 8, and 9 illustrate the coupling means resorted to in the prior art.

With reference to FIGURES 1-5, there is illustrated a hole saw assembly 10 which comprises a mandrel 11 and a hole saw blade 12 secured to the mandrel. The mandrel 11 is provided with a body portion 13, a screw-threaded projecting portion 14, and a hexagonal shank portion 15 by means of which the mandrel and the entire assembly may be driven by means of a portable electric drill or suitable tool. The mandrel carries a pilot drill 16 which is retained by means of a set screw 17. The hole saw blade 12 is substantially cup-shaped and comprises a body portion 18 having cutting teeth 19 along its exposed edge and a backing or base portion 20 suitably secured to its body. The base portion 20 of the hole saw is provided with a central aperture 20a screw-threaded to the projection 14 on the mandrel, and the base portion 20 of the hole saw is further provided with a pair of apertures 21 which preferably are disposed diametrically opposite to one another.

A pair of drive elements or pins 22 are journaled— independently of one another—for axial sliding movement within respective through bores 23 formed in the mandrel body. A pair of parallel spaced-apart external annular grooves 24, see FIGURE 4, are formed on each pin; and a split resilient ring 25 or its equivalent, see FIGURE 5, is seated coaxially within an external annular groove 26 formed on the mandrel body radially of the drive pins 22. The split resilient ring 25 cooperates with one or the other of the grooves 24 formed on the respective pins, thereby providing a resiliently-biased detent means between each of the drive pins and the mandrel body.

Consequently, the drive pins 22 have two alternate positions with respect to the mandrel body 13, one advanced and the other retracted; and in their advanced position, the pins engage within the respective apertures 21 formed in the base portion 20 of the hole saw 12 to thereby positively couple the hole saw to the mandrel.

Preferably, the split resilient ring 25 has a pair of radially-enlarged portions forming pockets 27 within which the respective drive pins 22 are engaged, as shown more clearly in FIGURE 3, for preventing rotation of the split resilient ring 25 relative to the mandrel body. The grooves 24 on the drive pins, see FIGURE 4, are preferably radiused, as at 28, in the direction towards each other, but have a substantially squared or flat shoulder 29 formed thereon in a direction opposite from one another. The radii 28 facilitate a quick snap-action between the split resilient ring 25 and the respective drive pins 22, while the shoulders 29 tend to preclude the ring 25 from becoming totally disengaged from the grooves 24. Moreover, the end of each drive pin has a third external annular groove 30 formed thereon towards the end of the pin so as to facilitate the manual advanced or retraction of the respective pin relative to the mandrel body.

The advantages and inherent utility of the coupling means of the present invention may be more clearly appreciated by a comparison with the structures heretofore resorted to in the prior art. In FIGURE 7, the pins 22' are threadably engaged in the mandrel body 13' and have respective screwdriver kerfs 31 to facilitate their alternate advance and retraction. In FIGURE 8, the pins 22'' are journaled for axial sliding movement on the mandrel body 13'', but are keyed together for a conjoint axial movement by means of a knurled carrier plate 32 that is threaded to the mandrel shank, as at 33, and has an annular flange portion 34 seated in respective notches 35 formed in the pins. Each of their prior art commercial structures requires a visual alinement between the drive pins and their respective apertures formed in the base portion of the hole saw, a requirement which is altogether eliminated in the applicant's structure. In FIGURE 9, which is indicative of the now-expired Beckwith Patent 2,344,400, the pins 22''' are journaled for axial sliding movement on the mandrel body 13''', but like the prior art device of FIGURE 8, are keyed together for a conjoint axial movement by means of the carrier plate 36 within which the pins are anchored, as at 37. The plate carries a leaf spring 38 which co-operates with an external annular groove 39 formed on the mandrel shank. This prior are structure is not only more expensive to build, but also, it precludes the individual replacement of the drive pins should one of the pins become bent or otherwise jammed within its respective bore formed in the mandrel body. Also, by requiring a conjoint axial movement of the drive pins, this prior art structure becomes more difficult to manipulate and hence more susceptible to breakage. Furthermore, the same load bearing surface is presented between each pin and the mandrel body, a condition which aggravates the wear pattern and ultimately leads to a premature failure.

These deficiencies of the prior art are alleviated, if not altogether eliminated, by the structure of the present invention. The drive pins 22 are individually journaled on the mandrel body 13 and hence may be individually manipulated and, if bent or broken, individually replaced. No visual alinement is necessary between the pins and the respective apertures 21 in the base portion of the hole saw, yet the pins may be manually manipulated quickly and conveniently. The pins are free to rotate about their respective axes, and as the pins are advanced and withdrawn, they have a tendency to pivot slightly about their respective axes; hence different load bearing surfaces are presented, which distributes the wear on the surface of the pins and thus enhances their serviceability. Moreover, the pins can pass through the mandrel body in either direction which is a distinct advantage in easily replacing an individual pin should its lower end become bent or misshapen; and inasmuch as the pins are not threaded or oriented on the mandrel body, only a simple axial thrust, as provided by an arbor press (or drift pin and mallet), is necessary for their removal in the event the pins become bent.

Moreover, the split resilient ring 25, which preferably is economically formed as a wire spring, affords a degree of compensation for manufacturing tolerance accumulations in the center-to-center distance between each drive pin 22 and the mandrel body 13; also, between each pin and the location of its respective through bore 23 in the mandrel body; and also, in the circumferential alinement between each pin and its respective aperture 21 formed in the base portion of the hole saw.

A modification is illustrated in FIGURE 6. Here the mandrel 11a has duel pairs of drive pins 22a and 22b, thereby rendering the mandrel 11a "universal" for two ranges of hole saw diameters. The pins 22a accommodate the larger diameters and hence are spaced further apart to absorb the required loads. Obviously, the teachings of the present invention are equally applicable to one or more drive pins.

The coupling means of the present invention may be used equally as well with the conventional cup-shaped hole saws illustrated in the drawings or with a tubular replaceable blade such as is described in the co-pending Enders application, Ser. No. 351,078, filed March 11, 1964, entitled "Hole Saw Assembly," and assigned to the assignee of the present invention.

Obviously, many modifications may be made without departing from the basic spirit of the present invention; and accordingly, within the scope of the appended claims, the invention may be practiced other than has been specifically described herein.

I claim:

1. In a hole saw assembly comprising a driving mandrel and a tubular hole saw, the hole saw having a cutting edge and further having a base portion formed with a pair of apertures, the improvement in coupling means between the mandrel and the saw, which comprises:

(a) a pair of drive pins journaled for longitudinal sliding movement in respective bores formed in the mandrel;

(b) means for positively limiting the longitudinal sliding movement of each pin in each direction relative to the mandrel, whereby each pin has two positive locations with respect to the mandrel, one advanced and the other retracted;

(c) said last-named means including:
  (1) a pair of external annular grooves formed on each pin;
  (2) a resilient ring seated in an external annular groove formed on the mandrel, radially of the bores and in communication therewith; and
  (3) said ring being received within one of the external annular grooves formed on each pin, thereby exerting a retaining force of the pins in a direction radially inwardly of the mandrel;

(d) whereby, in their advanced position, the pins are received through the apertures in the base portion of the hole saw, thereby coupling the driving mandrel to the saw without requiring a visual alinement of the pins and apertures.

2. The improvement of claim 1, wherein:
(a) said resilient ring comprises a split ring having a pair of radially-enlarged pockets, diametrically opposite to one another;
(b) whereby said drive pins are received in said pockets, respectively, thereby precluding said ring from rotating with respect to the mandrel.

References Cited by the Examiner

UNITED STATES PATENTS

| | | | |
|---|---|---|---|
| 2,349,400 | 5/1944 | Beckwith | 77—69 |
| 2,619,211 | 11/1952 | Belden | 64—10 X |
| 3,080,184 | 6/1964 | Hays | 85—8.8 X |
| 3,138,183 | 6/1964 | Stewart | 143—85 X |

FOREIGN PATENTS 747,133   3/1956   Great Britain.

DONALD R. SCHRAN, *Primary Examiner.*